Feb. 19, 1935.  E. H. REMDE  1,991,577
RUNNING GEAR FOR VEHICLES
Filed Aug. 29, 1931   3 Sheets-Sheet 1
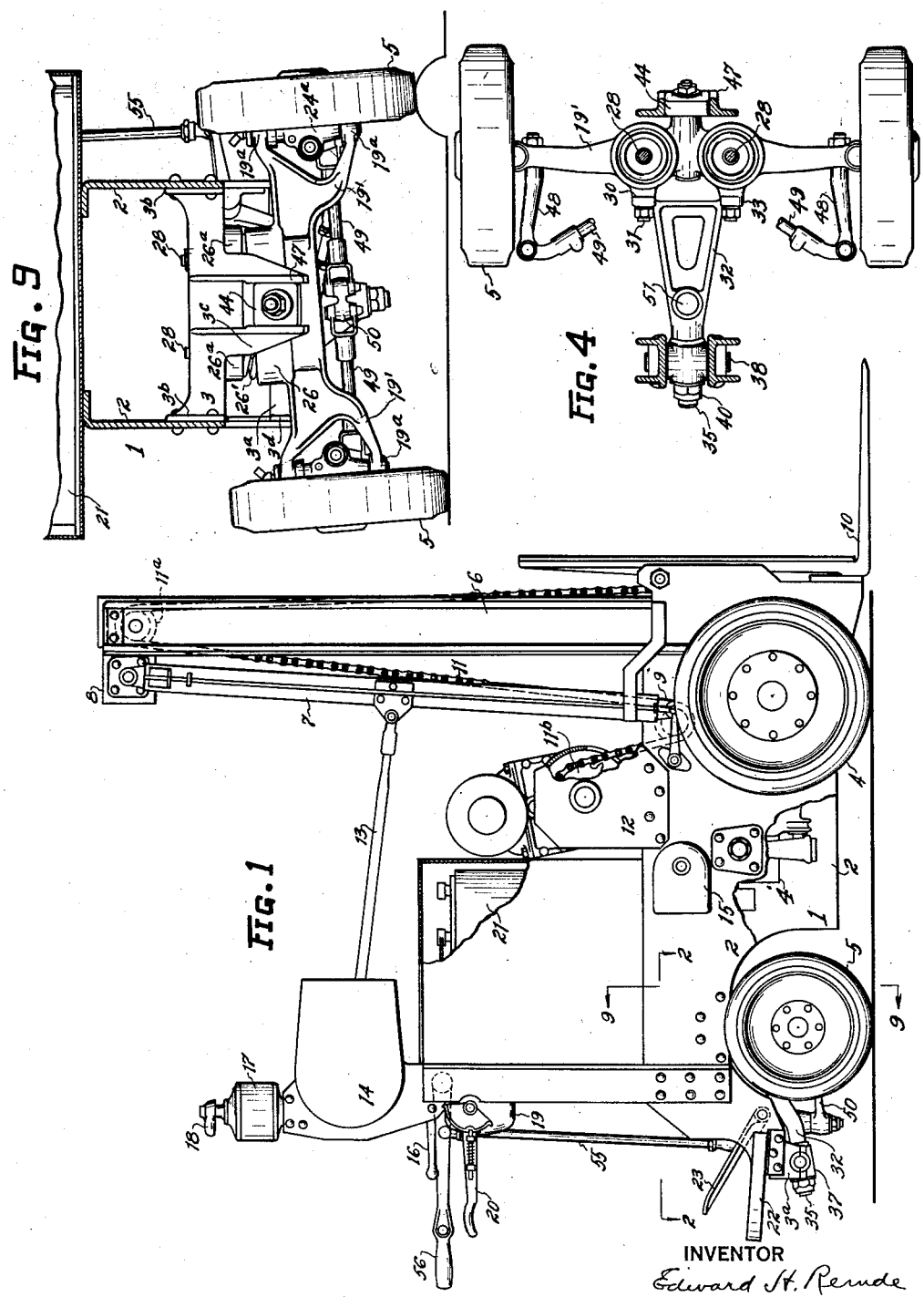
INVENTOR
Edward H. Remde
BY Geo. B. Pitts
ATTORNEY

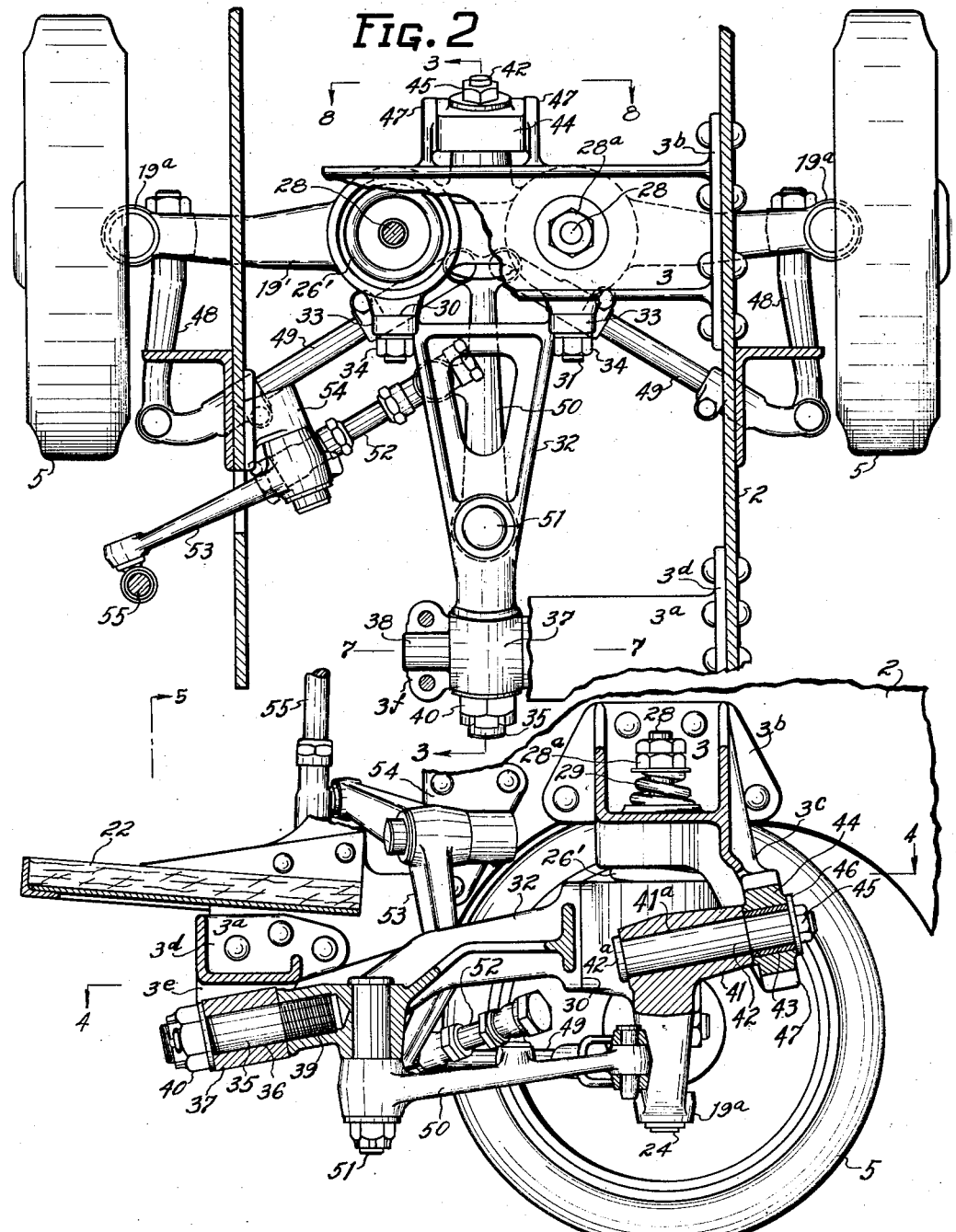

Feb. 19, 1935. E. H. REMDE 1,991,577
RUNNING GEAR FOR VEHICLES
Filed Aug. 29, 1931 3 Sheets-Sheet 3

INVENTOR
Edward H. Remde
BY Geo. B. Pitts
ATTORNEY

Patented Feb. 19, 1935

1,991,577

UNITED STATES PATENT OFFICE 1,991,577

RUNNING GEAR FOR VEHICLES

Edward H. Remde, Cleveland, Ohio, assignor to The Baker-Raulang Company, Cleveland, Ohio, a corporation of Ohio Application August 29, 1931, Serial No. 560,155

14 Claims. (Cl. 280—111)

This invention relates to a running gear for vehicles, more particularly, mountings for vehicle axles.

One object of the invention is to provide an improved mounting for a vehicle axle arranged to permit the axle to rock on a longitudinal axis, whereby the wheels on the axle may freely accommodate themselves to unevenness occurring in the surface over which they run.

Another object of the invention is to provide, in a vehicle having springs interposed between the axle and its chassis, an improved mounting for the axle capable of (a) rocking about a substantially horizontal, longitudinal axis, (b) permitting relative vertical movements between the axle and chassis, (c) maintaining the axle in transverse relation to the chassis while permitting the aforesaid movements to take place and (d) preventing torsional movement of the axle.

Another object of the invention is to provide between a vehicle chassis and an axle an improved mounting or running gear wherein related slidable guide elements at or adjacent the axle ends and between the latter and the chassis are eliminated and wherein the axle is free to move vertically relative to the chassis without imparting thereto unbalanced stresses to insure ease of operation and long life.

Other objects of the invention will be apparent to those skilled in the art to which my invention relates from the following description taken in connection with the accompanying drawings.

Either one or both axles may be mounted in the manner herein disclosed; but for purposes of illustrating one application of the invention, I have shown it in connection with the vehicle rear axle and carrying dirigible wheels.

Fig. 1 is a side elevation of a vehicle having a running gear embodying my invention.

Fig. 2 is a fragmentary sectional view substantially on the line 2—2 of Fig. 1, showing in plan the mounting for the rear wheels of the vehicle.

Fig. 3 is a section on the line 3—3 of Fig. 2.

Fig. 4 is a fragmentary sectional view substantially on the line 4—4 of Fig. 3.

Fig. 9 is a fragmentary section on the line 9—9 of Fig. 1, showing the position of the axle when one wheel thereon rides an obstruction.

Figure 7:
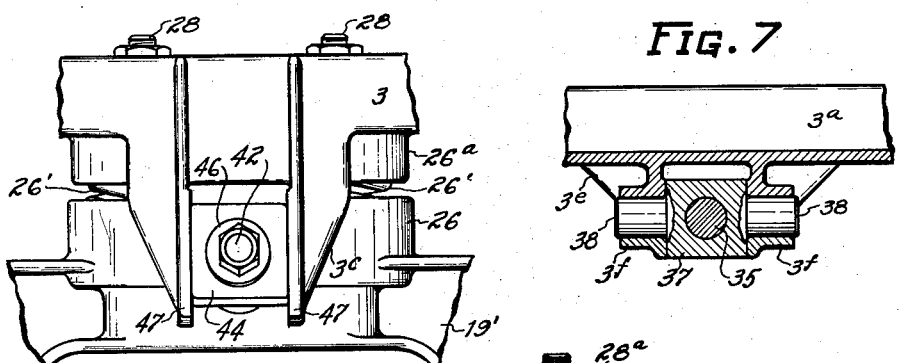
Fig. 7 is a section on the line 7—7 of Fig. 2.
Figures 6, 8:
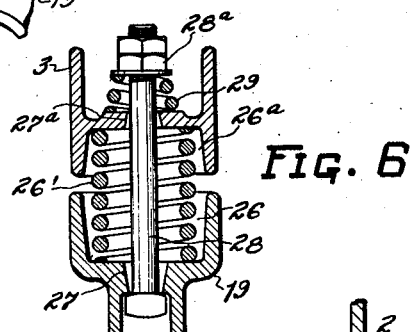
Fig. 6 is a fragmentary elevation on the line 6—6 of Fig. 5.
Fig. 8 is a fragmentary view on the line 8—8 of Fig. 2.

I have shown my improved mounting incorporated in an industrial truck between the truck chassis and the axle for the trailing wheels, which, in this embodiment, are at the operating end of the truck and are steerable.

Referring to the drawings, 1 indicates the truck chassis preferably comprising spaced vertical side plates 2, suitably connected by cross members, one thereof being indicated as an entirety at 3 and another being indicated as an entirety at 3a. The chassis is mounted on a pair of traction wheels 4 at one end and steerable trailing wheels 5 at its opposite end. The traction wheels 4, the driving mechanism therefor and motor 4' and the mounting for the mechanism and motor are preferably similar to corresponding parts shown in Letters Patent No. 1,628,145, dated May 10, 1927, and issued to me and John H. Hertner, for which reason illustration of these parts and further description is deemed unnecessary.

The illustrated construction of truck comprises a guide frame 6 having a sliding and pivotal bearing at its lower end portion on the chassis 1 and supported by a pair of bars 7 (only one being shown), the latter being pivotally connected at their upper ends to brackets 8 provided on the guide frame 6 and also pivotally mounted at their lower ends on the side plates 2, as shown at 9. 10 indicates an elevating member which may be raised and lowered on the guide frame 6, one or a pair of flexible members 11 being connected to the elevating member for this purpose. The flexible members run over guide elements 11a arranged at the upper end of the frame 6 and at the lower ends of the bars 7 and engage suitable sprockets 11b driven by a motor and power mechanism indicated as an entirety at 12. The bars 7 are swung about their pivots 9 to tilt the guide frame 6 by one or a pair of pitman rods 13 operated by crank disks, which are driven by a motor and power mechanism indicated as an entirety at 14. The motor for the mechanism 12 is operated through a controller 15 by a handle 16; the motor for the mechanism 14 is operated through a controller 17 by a handle 18; and the motor for driving the traction wheels 4 is operated through a controller 19 by a handle 20. 21 indicates electric batteries for supplying current to the motors above referred to. 22 is a platform for the truck driver to stand on. 23 indicates a brake operating pedal associated with the platform 22 and controlling a brake mechanism preferably substantially similar to the mechanism shown in the aforesaid patent. The cross member 3 is of substantially U-shape in cross section and provided (a) at its ends with end walls 3b, which are riveted to the side plates 2, and (b) centrally on its inner side with a depending bracket 3c the purpose of which will later appear. The cross member 3a is preferably substantially L-shaped and provided (a) with end walls 3d, which are riveted to the side plates 2, and (b) centrally on its lower side with depending lugs 3e having semi-circular seats to which are related semi-circular plates forming bearings 3f to which reference will later be made.

Figure 5:
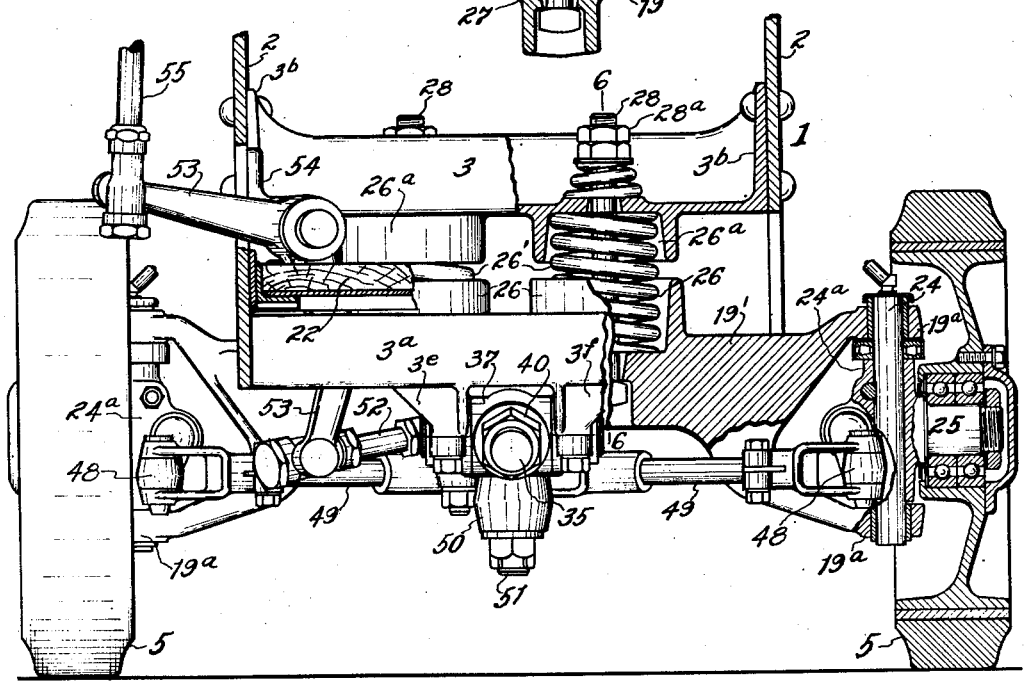
Fig. 5 is a section on the line 5—5 of Fig. 3, parts being broken away.

19' indicates the axle for the wheels 5 terminating at its opposite ends in pairs of knuckles 19a, each pair supporting a pivot pin 24 serving as a shaft for the body portion 24a of a wheel spindle 25 to rotate on. As shown in Fig. 5, each of the wheels 5 rotates on the adjacent spindle 25 in a well known manner. The upper side of the axle 19' is provided with pockets 26 which align with pockets 26a on the lower side of the cross member 3. The pockets 26, 26a, receive coiled expansion springs 26' to cushion jars imparted to the chassis 1 during operation of the vehicle. Centrally of these pockets the walls of the axle 19' and member 3 are formed with openings 27, 27a, respectively through which extends a bolt 28, the bolt forming a connection to limit undue relative movement between the axle and chassis. A spring 29 is preferably interposed between the bolt nut 28a and the member 3 to prevent rattling of the bolt, to hold it substantially stationary during relative movement between the chassis and axle, with its head against the axle 19' and to absorb undue shocks which might otherwise be imparted to the chassis.

The inner side of the axle 19' is provided with seats 30 from which project pins 31 having threaded end portions. 32 indicates a tail member having lugs 33 fitting against the seats 30. The lugs 33 are formed with openings through which the pins 31 extend, so that nuts 34 may be threaded on the pins to rigidly secure the lugs 33 to the seats 30. The free end of the tail member 32 is provided with a stud shaft 35 which rotatably fits a bearing 36 provided in a block 37. The block 37 is provided on its opposite sides with trunnions 38, which rotatably fit the bearings 3f. The trunnions 38 permit the axle 19' and tail member to swing in a vertical plane and the shaft 35 permits these parts to rock on a longitudinal axis. The stud shaft 35 is preferably provided by forming in the rear end of the tail member 32 a threaded opening 39 and inserting therein a threaded pin, the outer portion of which forms a shaft fitting the bearing 36. The pin preferably extends through the bearing 36 and therebeyond it is threaded to take a nut 40. As the tail member 32 engages the block on one side and the nut 40 engages therewith on its opposite side, the block and its mounting resist stresses which tend to impart to the axle 19' a torsional movement. The central portion of the axle 19' is provided on its outer side with a boss 41, a through opening 41a being formed in the axle and boss to form a support for the shank portion of a shaft 42. The inner end of the shaft 42 is provided with a head 42a which seats against the inner side of the axle. The outer end portion of the shaft is preferably reduced and rotatably fits a bushing 43 provided in an opening formed in a guide block 44. The shaft 42 is provided with a reduced, threaded free end to take a nut 45 which clamps a washer 46 against the resulting shoulder to hold the shaft in position and the block 44 in assembled relation therewith. The guide block 44 is slidably mounted between spaced guides 47, which depend from the bracket 3c, and permits relative movements vertically between the axle 19' and chassis 1. The guides 47 are preferably formed integral with the bracket 3c and prevent lateral endwise movement of the axle. The guide block 44 accordingly co-operates with the trunnioned block 37 to maintain the axle in transverse relation to the chassis 1 or at right angles to the normal direction of movement of the vehicle.

As shown in Figs. 2 and 3, the axes of the shafts 35 and 42 are co-incident and are disposed in a plane extending vertically through the central longitudinal axis of the chassis 1, so that the axle 19' is rocked about such axis due to unevenness of the surface; for example, where one wheel rides a hump, as shown in Fig. 9, or enters a depression. Also, as the axle is mounted to swing about a transverse axis on the block 37, the chassis and axle may move vertically relative to each other, to permit cushioning by the springs 26'.

From the foregoing description it will be seen that the axle is mounted on or connected to the chassis at two spaced points disposed in the plane extending vertically through the central longitudinal axis of the chassis, the connection on one side of the axle constituting a universal joint and the connection on the other side of the axle constituting a combined pivotal and slidable one. By this arrangement the axle is maintained in transverse relation to the chassis and parallel to the other axle for the vehicle, but is free to rock and swing relative to the chassis while being driven by its driving mechanism.

In my form of construction I eliminate the use of related guide elements between the chassis and axle at the ends of the latter. Also, my construction enables the wheels to accommodate themselves to unevenness of the floor or surface without undue strains on the chassis, so that tendency of tilting the latter is reduced.

The steering connections for the wheels 5 comprise arms 48 suitably fixed to the spindle bodies 24a and pivotally connected to the outer ends of links 49. The links 49 are pivotally connected at their inner ends to a main lever 50, which is pivotally mounted on a stud shaft 51, depending from the tail member 32, the lever 50 being in the vertical plane of the latter when the wheels 5 are in normal position. The main lever 50 is connected by a ball and socket joint to one end of a link 52, the other thereof being pivotally connected by a ball and socket joint to one arm of a bell crank 53, which is suitably mounted on a bracket 54 secured to the adjacent side plate 2. The other arm of the bell crank 53 is pivotally connected to a rod 55, which is operated by a lever or handle 56. By mounting the main lever 50 on the tail member, a single connection is provided between the steering elements that are connected to both wheel spindles and the elements mounted on the chassis 1. By such single connection the axle is free to rock and the chassis and axle are free to move relative to each other and steering is positively controlled during such movements of the axle and chassis.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a vehicle, the combination with a chassis, of an axle having wheels for supporting said chassis, a member on one side of said axle mounted on said chassis to rock on a transverse axis, a connection between said axle and said member disposed centrally of said chassis and permitting said axle to rock on a central longitudinal axis, and a combined pivotal and slidable connection between the opposite side of said axle and said chassis, the axis of the pivot of the last mentioned connection being co-incident with the axis of the first mentioned connection, said combined pivotal and slidable connection permitting said axle to swing about the transverse axis for said member while maintaining the axis of its pivot co-incident with the axis of said first mentioned connection.

2. In a vehicle, the combination with a chassis, of an axle having wheels for supporting said chassis, and a pair of spaced pivot connections between said chassis and said axle, the axes of the pivot connections being disposed co-incidently and extending approximately through the center of said axle and centrally and longitudinally of said chassis, one pivot element for one connection being mounted to rock on a transverse axis, and the pivot element of the other connection carried by said chassis being mounted to move thereon about said transverse axis while maintaining said co-incident relation between the pivot elements of said connections.

3. In a vehicle, the combination with a chassis, of an axle having wheels for supporting said chassis, a member trunnioned on a transverse axis on said chassis, a block slidable on said chassis in a vertical plane, and shafts on said axle disposed co-incidently and centrally and longitudinally of said chassis and having bearing in said member and block to permit said axle to rock.

4. In a vehicle, the combination with a chassis, of a pair of vertical guides depending from said chassis, a block slidably engaging said guides, a member spaced from said guides and trunnioned on said chassis to rock on a transverse axis, and an axle having wheels for supporting said chassis, said axle being trunnioned on said block and said member on an axis extending centrally and longitudinally of said chassis.

5. In a vehicle, the combination with a chassis, of an axle having a tail member on one side disposed midway the ends of said axle, a universal joint connection between the free end of said tail member and said chassis, a member slidably engaging said chassis to move vertically, and a pivot connection between the other side of said axle and said last mentioned member, the axes of said pivot connection and said joint being in a plane disposed vertically and extending longitudinally of said chassis.

6. In a vehicle, the combination with a chassis, of an axle having wheels for supporting said chassis, and connections between said axle and said chassis, said connections consisting of a universal joint connection between said chassis and one side of said axle, a combined pivotal and slidable connection between said chassis and the other side of said axle, the axis of the pivot for said last mentioned connection and the axis of said universal joint being disposed co-incidently and extending approximately through the center of said axle and centrally and longitudinally of said chassis and compression springs between said chassis and said axle.

7. In a vehicle, the combination with a chassis, of an axle, dirigible wheels on the ends of said axle, a universal joint connection between said chassis and one side of said axle, a combined pivotal and slidable connection between said chassis and the other side of said axle, the axis of the pivot for said connection and the axis of said universal joint being disposed co-incidently and extending longitudinally of said chassis, a main lever pivoted on said axle, operating connections between said lever and said wheels, and means on said chassis and connected to said lever for operating it.

8. In a vehicle, the combination with a chassis, of an axle having wheels for supporting said chassis, a member on one side of said axle mounted on said chassis to rock on a transverse axis, a connection between said axle and said member disposed centrally of said chassis and permitting said axle to rock on a central longitudinal axis extending approximately through the center of said axle, a combined pivotal and slidable connection between the opposite side of said axle and said chassis, permitting said axle to swing about the transverse axis of said member, the axis of the pivot of the last mentioned connection being co-incident with the axis of the first mentioned connection, and a compression spring interposed between said chassis and said axle.

9. In a vehicle, the combination with a chassis, of an axle having wheels for supporting said chassis, a member trunnioned on a transverse axis on said chassis, a block slidable on said chassis in a vertical plane, shafts on said axle disposed in axial relation centrally and longitudinally of said chassis and having bearing in said member and block to permit said axle to rock, and cushioning means interposed between said chassis and said axle.

10. In a vehicle, the combination with a chassis, of a pair of vertical guides depending from said chassis at opposite sides of a line extending centrally and longitudinally thereof, a block slidably engaging said guides, a member spaced from said guides longitudinally of said chassis and trunnioned thereon to rock on a transverse axis, an axle having wheels for supporting said chassis, said axle being trunnioned on said block and said member on an axis extending centrally and longitudinally of said chassis, and a spring disposed between said chassis and said axle.

11. In a vehicle, the combination with a chassis, of an axle having a tail member on one side disposed midway the ends of said axle, a universal joint connection between the free end of said tail member and said chassis, a member slidably engaging said chassis to move vertically, a pivot connection between the other side of said axle and said member, the axes of said pivot connection and said joint being in a plane disposed vertically and extending approximately through the center of said axle and centrally and longitudinally of said chassis, and a compression spring interposed between said chassis and said axle.

12. In a vehicle, the combination with a chassis, of an axle having wheels for supporting said chassis, a universal joint connection between said chassis and one side of said axle, a combined pivotal and slidable connection between said chassis and the other side of said axle, the axis of the pivot for said connection and the axis of said universal joint being disposed co-incidently and extending approximately through the center of said axle and centrally and longitudinally of said chassis, and a compression spring interposed between said chassis and said axle.

13. In a vehicle, the combination with a chassis, of an axle, dirigible wheels on the ends of said axle, a universal joint connection between said chassis and one side of said axle, a combined pivotal and slidable connection between said chassis and the other side of said axle, the axis of the pivot for said connection and the axis of said universal joint being disposed co-incidently and extending longitudinally of said chassis, a main lever pivoted on said axle, operating connections between said lever and said wheels, means on said chassis and connected to said lever for operating it, and a spring interposed between said chassis and said axle.

14. In a vehicle, the combination with a chassis, of an axle having dirigible wheels mounted on its end portions, a pair of spaced pivot connections between said chassis and said axle, the axis of said connections being disposed co-incidently and centrally and longitudinally of said chassis, the pivot element for one connection being mounted to rock on an axis transverse to said chassis and the pivot element for the other connection being mounted to slide vertically on said chassis, and means for steering said wheels, said means including linkages connected to said wheels and a device common to said linkages and mounted to swing about an axis intersecting an imaginary line co-incident with the axes of said pivot connections.

EDWARD H. REMDE.